United States Patent [19]

Morishita

[11] 4,355,480
[45] Oct. 26, 1982

[54] REEL MOUNTING HANDLE
[75] Inventor: Yasomatsu Morishita, Kure, Japan
[73] Assignee: Ryobi, Ltd., Hiroshima, Japan
[21] Appl. No.: 167,079
[22] Filed: Jul. 9, 1980

Related U.S. Application Data

[63] Continuation of Ser. No. 10,444, Feb. 8, 1979, abandoned.

[30] Foreign Application Priority Data

Feb. 8, 1978 [JP] Japan ................................ 53-15493

[51] Int. Cl.³ ............................................ A01K 87/06
[52] U.S. Cl. ............................................ 43/22; 43/23
[58] Field of Search ...................... 43/18 R, 22, 23, 24

[56] References Cited
U.S. PATENT DOCUMENTS

| | | | |
|---|---|---|---|
| 2,424,430 | 7/1947 | Beyer | 43/22 |
| 2,593,747 | 4/1952 | Godfrey | 43/22 |
| 2,756,531 | 7/1956 | Hollenshead | 43/22 |
| 3,181,264 | 5/1965 | Simone | 43/22 |

Primary Examiner—Nicholas P. Godici
Attorney, Agent, or Firm—Sughrue, Mion, Zinn, Macpeak and Seas

[57] ABSTRACT

A reel mounting handle having a reel foot holding member slidably disposed in a guide member extending from a reel mounting portion. The holding member is of a cross shape in cross section, the upper and lower major projections being extended out from the openings longitudinally formed in the guide member. The guide member is formed with a bore along the length thereof to slidably receive the holding member. The bore has substantially the same cross sectional shape as that of the minor projections of the movable member. The major projections are formed with threads at the peripheral end surfaces thereof, respectively to engage a sleeve rotatably disposed adjacent the reel mounting portion.

4 Claims, 7 Drawing Figures

REEL MOUNTING HANDLE

This is a continuation of application Ser. No. 10,444 filed Feb. 8, 1978 now abandoned.

BACKGROUND OF THE INVENTION

This invention relates to a reel handle, and more particularly, to a type thereof wherein a reel holder is slidably disposed on the reel handle to secure a reel foot thereto.

Conventional reel holders are provided with a stationary hook disposed at a rear end of a reel attaching groove, into which one end of the reel foot is inserted, and a member positioned at the front end of the reel attaching groove to which the other end of the reel foot is pressingly fixed. The latter member is movable along the length of the reel attaching groove by the rotation of a sleeve with which the member is threadingly engaged. By the movement of the movable member, the reel foot is pressingly secured between the hook and the movable member, to thus fix the reel to the reel mounting handle.

Such conventional device is disclosed in Japanese Utility Model publication No. 51-8874, as shown in FIG. 1. In FIG. 1, a sleeve 50 having an inner thread is rotatably disposed on a rod holder 51, and a L-shaped movable member 52 is engaged with the inner thread of the sleeve 50. By the rotation of the sleeve 50, the movable member 52 is moved rightwardly or leftwardly in the drawing to fix or release the reel foot.

In this device, however, the movable member 52 may not be moved in parallel with the axis of the sleeve 50, since the thread of the movable member is only formed at one surface thereof, and since the member is of L-shape, there is a probability that the displacement of a hook portion 53 of the movable member may not be coincident with the displacement of the thread of the movable member. This is due to the fact that the engagement between the sleeve and the movable member is insufficient, so that the movable member may be inclined, when the member urges the reel foot, resulting in that sufficient pressing engagement between the reel foot and the movable member may not be obtainable. Further, the thread portion may be damaged due to the insufficient engagement under stress.

SUMMARY OF THE INVENTION

It is therefore, an object of this invention to provide an improved reel holder free of insufficient pressing engagement between the holder and the reel foot.

The object according to this invention is attained by providing a movable member having a substantially cross shape in cross section. The movable member is slidably disposed in a bore formed in a front portion extending from the reel mounting portion. The bore has a corresponding cross sectional shape to the movable member but the upper and lower portions thereof are opened throughout along its length to project out the upper and lower projections (major projections) of the movable member. These major projections are formed with threads at the peripheral end surfaces thereof, respectively to threadingly engage an inner thread formed in a sleeve rotatably disposed in the front portion adjacent to the reel mounting portion.

The movable member slides in the bore by rotating the sleeve. In this case the surface abuttment between stepped portions of the bore and the movable member can sustain stress generated by the press fixing of the reel foot to the movable member, so that the thread portion may not be damaged. Further, since the upper and lower threads are respectively engaged with the inner thread of the sleeve, accidental offsetting of the movable member is prevented during its sliding movement.

The invention will be described with reference to the accompanying drawings and the description of the preferred embodiment that follows.

DETAILED DESCRIPTION OF THE INVENTION

Figure 1:
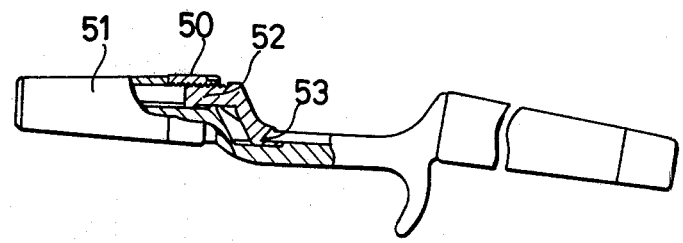
FIG. 1 shows a partial cross-sectional view showing the conventional reel handle body.
Figure 3:
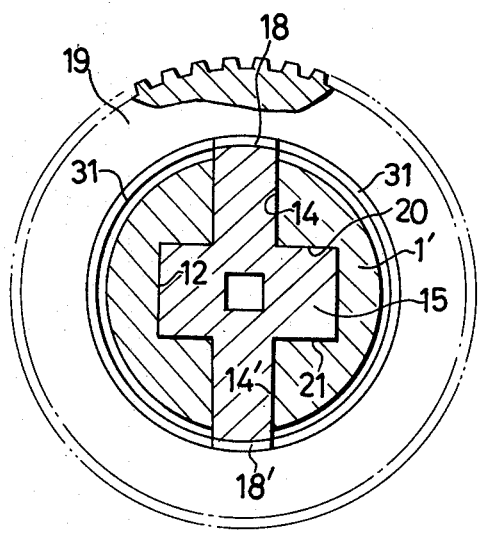
FIG. 3 shows a cross-sectional elevation taken along the line III—III of FIG. 2.
Figure 2:
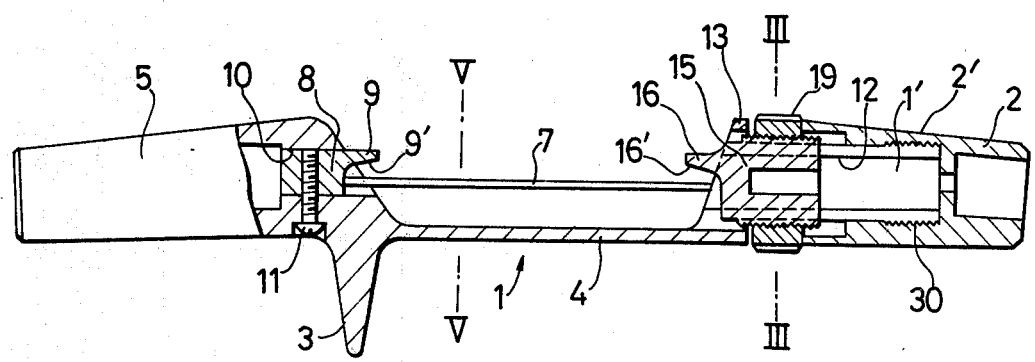
FIG. 2 shows a cross-sectional elevation of a reel handle according to this invention.
Figure 4:
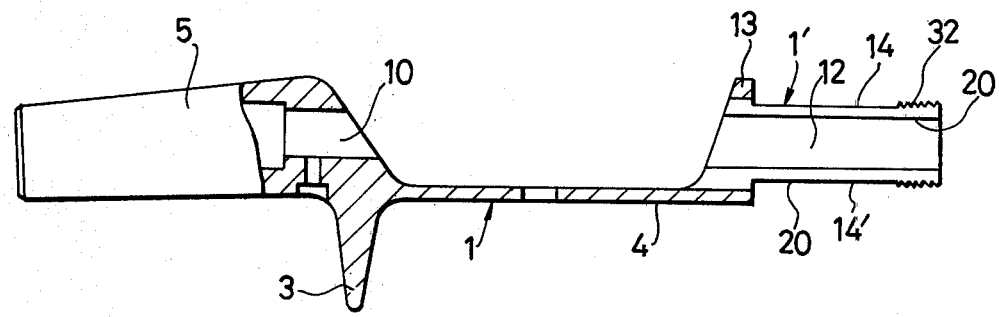
FIG. 4 shows a cross-sectional view of a body of a reel handle according to this invention.
Figure 5:
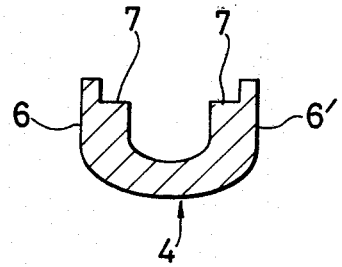
FIG. 5 shows a cross-sectional view taken along the line V—V of FIG. 2.
Figure 6:
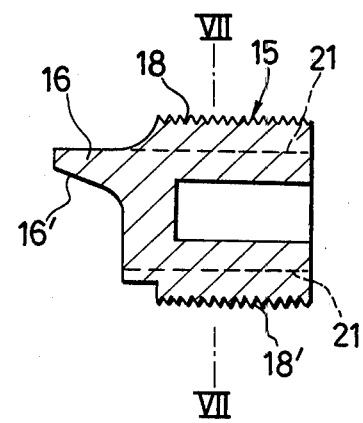
FIG. 6 is a cross-sectional view of a movable member according to this invention; and, FIG. 7 is a cross sectional view taken along the line VII—VII of FIG. 6.
Figure 7:
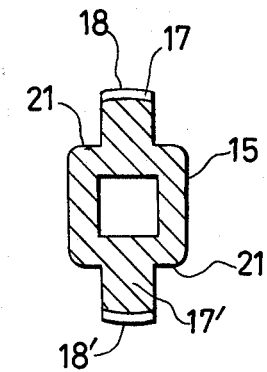

Referring to FIG. 2, a reel mounting handle 1 consists of a rod holder 2 at its front end portion, a reel mounting portion 4 at its intermediate portion and a gripper portion 5 at its rear portion. The reel mounting portion 4 is integrally provided with a trigger 3 disposed at the lower portion thereof. The reel mounting portion 4 has a substantially U-shaped cross section (FIG. 5) and the upper end of the side walls 6,6' are formed with a groove 7 to mount a reel foot (not shown) thereon.

A stationary member 8 having a holder 9 at its front end is disposed in a space 10 formed in a front end portion of the gripper 5. The member 8 is fixedly secured to the gripper 5 by a bolt 11.

On the other hand, a movable member 15 is slidably disposed in a bore 12 formed in a front portion 1' longitudinally extending from the reel mounting portion 4. The bore 12 is of substantially cross shape, and upper and lower portion thereof are opened throughout its length as at 14, 14' to project out upper and lower projections 17,17' of the movable member 15. That is, the cross sectional shape of the movable member 15 is substantially the same as the cross sectional shape of the bore 12, but the upper and the lower projections 17, 17' (major projections) project out from the bore openings 14,14'. The movable member 15 has a rear end provided with a reel foot holder 16, the lower surface of which is slanted. Further, the major projections 17,17' are formed with threads 18, 18' at peripheral end surfaces thereof, respectively, each having equal pitch.

These threads 18,18' engage an inner thread 31 of a sleeve 19 rotatably disposed between a stopper wall 13 upstanding from the front end portion of the groove 7 and a cylindrical member 2' engaged with the front portion 1' as at 30 and 32 with adhesive materials. The front end portion of the cylindrical member 2' is in the form of the rod holder 2, and the stopper wall 13 is formed with a bore to allow passing of the movable member therethrough.

In mounting the reel (not shown) on the reel handle 1, one end of the reel foot (not shown) is inserted into the stationary member 8, and then the foot is placed on the groove 7. Thereafter, the sleeve 19 is rotated to slide the movable member 15 leftwardly in the drawing to pressingly engage the other end of the reel foot with the member 15. The displacement of the reel foot along the longitudinal direction thereof can be prevented by the side walls of the members 8 and 15, while the vertical displacement thereof can be prevented by the groove 7 and the holder surfaces 9' and 16'.

In this invention, since the lower surfaces 9' and 16' of the holders 9 and 16 are slanted, the stationary and movable members 8 and 15 are subject to stress along the upward direction thereof when the reel foot is pressingly secured. Such stress may not affect the stationary member 8, but may damage the threaded portion of the movable member or may cause insufficient engagement between the thread 18 18' and the inner thread 31.

However, according to this invention, since the member 15 is of cross shape and the bore has a corresponding shape, the abuttment of the stepped portions therebetween can receive the stress, to thereby obviate direct stress application to the threaded portions. Further, since the upper and lower surfaces of the major projections 17,17' are formed with threads 18,18', the member 15 can move in parallel with the axis of the bore 12 or sleeve 19. That is, the displacement of the upper projection is equal to that of the lower projection, so that the offsetting of the movable member 15 can be prevented to thereby properly secure the reel foot to the reel holders, which in turn, provides long service life without damaging these threads.

While the invention has been described in detail and with reference to specific embodiment thereof, it wil be apparent to one skilled in the art that various changes and modifications can be made therein without departing from the spirit and scope thereof.

What is claimed is:

1. In a reel mounting handle including a gripper at its rear portion, a reel mounting portion at its intermediate portion, and a rod holder at its front portion, said reel mounting portion being formed with groove to mount a reel foot thereon, the improvement comprising:
    (a) a stationary member disposed at a front end of the gripper to secure one end of the reel foot, said stationary member having a hook at its front end,
    (b) a movable member slidably disposed in a front portion of the reel mounting portion to secure the other end of the reel foot,
    (c) a guide member positioned at the front portion of the reel mounting portion, and adapted to enclosed guide the movable member for sliding movement, and
    (d) a sleeve rotatably disposed in the front portion, the movable member being of cruciform shape in cross section and having major and minor generally rectangular projections and a reel foot holder formed integrally therewith, the major projections extending outwardly of the guide member to engage the sleeve, the minor projections being guided within the guide member and preventing relative rotation between the movable member and the guide member, the guide member being formed substantially along the entire length of said front portion with a bore having a cruciform shape complementary to that of the movable member, said bore being open rearwardly toward the reel mounting portion for removal and insertion of the movable member therethrough, the upper and lower portions of the bore being opened along the length thereof such that the major projections extend outwardly of the openings.

2. The device of claim 1, wherein the major projections have peripheral end surfaces formed with threads, respectively, to engage an inner thread formed in the sleeve.

3. The device of claim 1, further comprising a stopper wall upstanding adjacent to the front portion of the reel mounting portion, and a cylindical member engaged with the front portion, the sleeve being disposed between the stopper wall and the cylindrical member.

4. The device of claim 1, wherein said reel mounting portion has U-shape in cross section, the upper surfaces of side wall of the U-shaped member being formed with the groove for mounting the reel foot.

* * * * *